US009886795B2

(12) United States Patent
Fialho et al.

(10) Patent No.: US 9,886,795 B2
(45) Date of Patent: Feb. 6, 2018

(54) METHOD AND APPARATUS FOR TRANSITIONING FROM A PARTIAL MAP VIEW TO AN AUGMENTED REALITY VIEW

(75) Inventors: André Tadeu Santos Fialho, Berlin (DE); Frank Gaebler, Berlin (DE); Alexandru Piukovici, Berlin (DE); Ciprian Cudalbu, Berlin (DE); Greg Hicks, Berlin (DE)

(73) Assignee: HERE Global B.V., Veldhoven (NL)

( * ) Notice: Subject to any disclaimer, the term of this patent is extended or adjusted under 35 U.S.C. 154(b) by 298 days.

(21) Appl. No.: 13/604,440

(22) Filed: Sep. 5, 2012

(65) Prior Publication Data
US 2014/0063058 A1 Mar. 6, 2014

(51) Int. Cl.
G06T 19/00 (2011.01)
G01C 21/36 (2006.01)
G06T 11/60 (2006.01)

(52) U.S. Cl.
CPC .......... *G06T 19/006* (2013.01); *G01C 21/367* (2013.01); *G01C 21/3635* (2013.01); *G06T 11/60* (2013.01); *G06T 19/00* (2013.01)

(58) Field of Classification Search
CPC .................................................. G06T 19/006
USPC ........................................................ 345/633
See application file for complete search history.

(56) References Cited

U.S. PATENT DOCUMENTS

| 6,452,544 B1* | 9/2002 | Hakala | G01C 21/20 |
| | | | 342/357.31 |
| 2008/0162043 A1* | 7/2008 | Emoto et al. | 701/211 |
| 2010/0045667 A1* | 2/2010 | Kornmann | G06F 1/1626 |
| | | | 345/419 |
| 2010/0305849 A1* | 12/2010 | Nirhamo | 701/206 |
| 2011/0279446 A1* | 11/2011 | Castro | G01C 21/20 |
| | | | 345/419 |
| 2012/0216149 A1 | 8/2012 | Kang et al. | |
| 2013/0006525 A1* | 1/2013 | Stroila | G01C 21/20 |
| | | | 701/434 |

FOREIGN PATENT DOCUMENTS

| CN | 101833896 A | 7/2013 |
| EP | 1 873 494 A1 | 1/2008 |
| JP | 2008014974 A | 1/2008 |
| KR | 20120094176 A | 8/2012 |

OTHER PUBLICATIONS

Lucasfinley, "Google Earth App Review for iPad", dated Jun. 18, 2010, https://www.youtube.com/watch?v=n91jje0BJz8, time: 1:20-1:40.*

(Continued)

*Primary Examiner* — Barry Drennan
*Assistant Examiner* — Shivang Patel
(74) *Attorney, Agent, or Firm* — Ditthavong & Steiner, P.C.

(57) ABSTRACT

An approach is provided for providing a map view that compliments an augmented reality view while a user navigates and interacts within a scene. A mapping platform determines a virtual floor surface of at least one presentation of a perspective-based display of location information. A mapping platform causes, at least in part, a rendering of a partial map view on the virtual floor surface, wherein the partial map view provides an alternate view of the location information.

20 Claims, 10 Drawing Sheets

(56) References Cited

OTHER PUBLICATIONS

International Search Report and Written Opinion for corresponding Patent Application No. PCT/EP2013/061649 dated Oct. 30, 2013, 12 pages.
Office Action for related Korean Patent Application No. 2015-7008726, dated Feb. 18, 2016, 14 Pages.
Chinese Office Action for related Chinese Patent Application No. 201380057533.7 dated Sep. 27, 2016, 6 Pages.

\* cited by examiner

METHOD AND APPARATUS FOR TRANSITIONING FROM A PARTIAL MAP VIEW TO AN AUGMENTED REALITY VIEW

BACKGROUND

Service providers and device manufacturers (e.g., wireless, cellular, etc.) are continually challenged to deliver value and convenience to consumers by, for example, providing compelling network services. One area of interest has been the development of augmented and/or mixed reality applications (e.g., mapping and/or navigation applications) for a user device, such as a mobile device (e.g., a mobile phone or a tablet), that feature interactive overview information corresponding with points of interest (POIs) in a particular location (e.g., contact information, hours of operation, ratings/reviews, etc.). More specifically, when the interactive content and overview information is convincingly spatially linked to corresponding POIs in the real-world environment, spatial immersion is achieved so that a user feels that the interactive scene is perceptually convincing and that he or she is really "there." Another area of interest has been the development of partial map views (e.g., a two-dimensional (2D) map abstraction or a mini-map) that can be displayed along with the interactive scene to provide a user with a better understanding of his or her virtual positioning and orientation and spatial relationship to POIs within the simulated scene. However, partial map views generally have to be large enough for the user to understand his or her surroundings and, therefore, when placed on top of or in the corner of the panoramic view, they can decrease the sense of spatial immersion and occlude important information. Accordingly, service providers and device manufacturers face significant technical challenges in providing a service that provides a partial map view that compliments an augmented reality view while a user navigates and interacts within a scene.

SOME EXAMPLE EMBODIMENTS

Therefore, there is a need for an approach for providing a partial map view that compliments an augmented reality view while a user navigates and interacts within a scene.

According to one embodiment, a method comprises determining a virtual floor surface of at least one presentation of a perspective-based display of location information. The method also comprises causing, at least in part, a rendering of a partial map view on the virtual floor surface, wherein the partial map view provides an alternate view of the location information.

According to another embodiment, an apparatus comprises at least one processor, and at least one memory including computer program code for one or more computer programs, the at least one memory and the computer program code configured to, with the at least one processor, cause, at least in part, the apparatus to determine a virtual floor surface of at least one presentation of a perspective-based display of location information. The apparatus also causes, at least in part, a rendering of a partial map view on the virtual floor surface, wherein the partial map view provides an alternate view of the location information.

According to another embodiment, a computer-readable storage medium carries one or more sequences of one or more instructions which, when executed by one or more processors, cause, at least in part, an apparatus to determine a virtual floor surface of at least one presentation of a perspective-based display of location information. The apparatus also causes, at least in part, a rendering of a partial map view on the virtual floor surface, wherein the partial map view provides an alternate view of the location information.

According to another embodiment, an apparatus comprises means for determining a virtual floor surface of at least one presentation of a perspective-based display of location information. The apparatus also comprises means for causing, at least in part, a rendering of a partial map view on the virtual floor surface, wherein the partial map view provides an alternate view of the location information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing a partial map view that compliments an augmented reality view while a user navigates and interacts within a scene. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
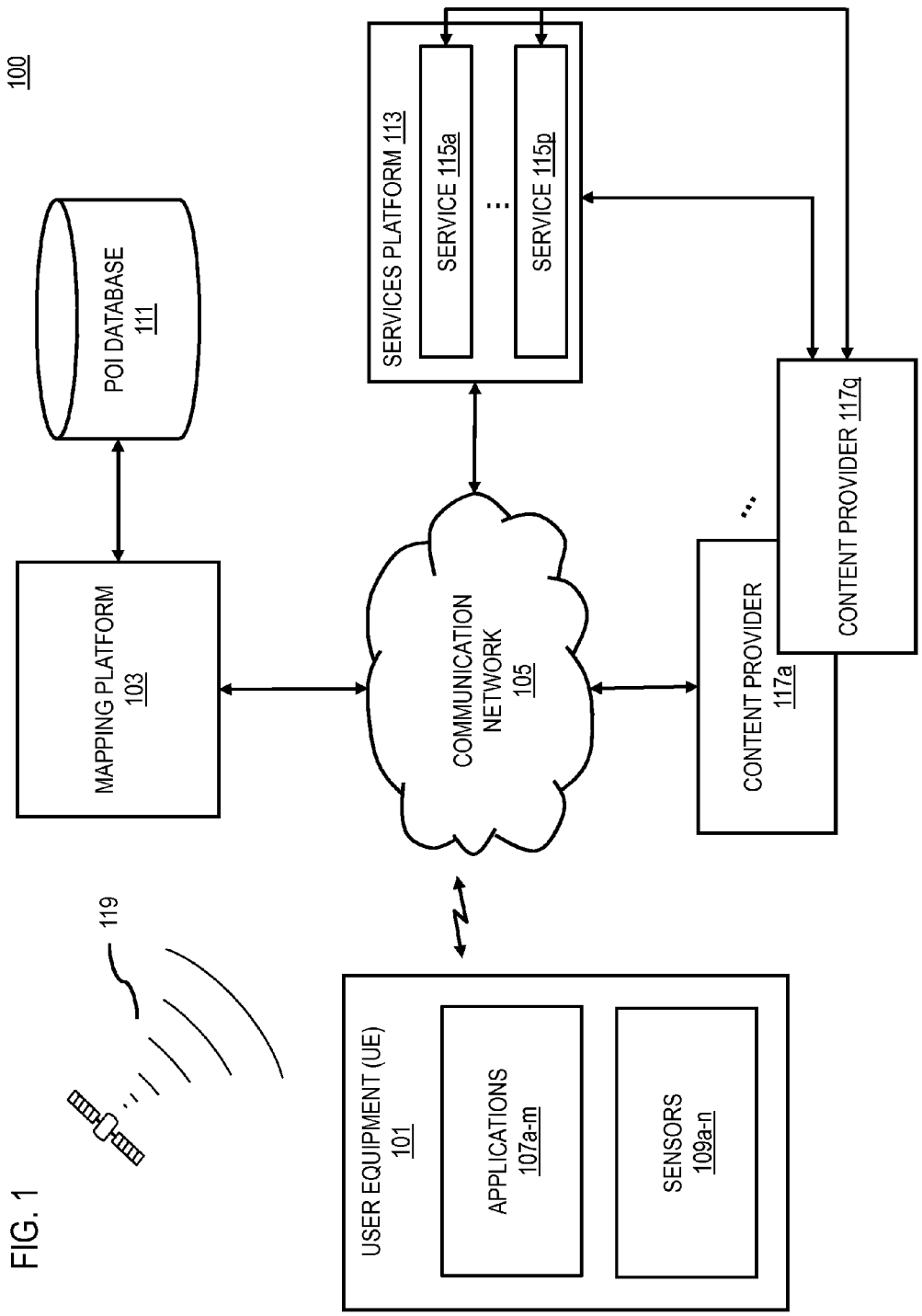
FIG. 1 is a diagram of a system capable of providing a partial map view that compliments an augmented reality view while a user navigates and interacts within a scene, according to one embodiment.

FIG. 1 is a diagram of a system capable of providing a partial map view that compliments an augmented reality view while a user navigates and interacts within a scene, according to one embodiment. As previously discussed, one area of interest among service providers and device manufacturers is the development of augmented and/or mixed reality applications (e.g., scenes or environments) for a user device, such as a mobile device (e.g., a mobile phone or a tablet), that feature interactive overview information corresponding with POIs in a particular location. In particular, when the interactive content and overview information is convincingly spatially linked to corresponding POIs in the real-world environment, spatial immersion is achieved. A complimentary area of interest is the development of partial map views (e.g., a 2D map abstraction or a mini-map) that provide a user with a better understanding of his or her virtual positioning and orientation and spatial relationship to POIs within the simulated scene. For example, the partial map view can include visual clues representing the user's current position, the direction that the user is facing, and the user's viewing angle or field of view (FOV). Moreover, partial map views may provide the user with an entry point for transitioning from the augmented reality view to a full 2D map (e.g., the user can click on the partial map view to initiate the transition). However, partial map views generally have to be large enough for the user to understand his or her surroundings and, therefore, when placed on top of or in the corner of the panoramic view, they can decrease the sense of spatial immersion and occlude important information.

To address this problem, a system 100 of FIG. 1 introduces the capability to provide a partial map view that compliments an augmented reality view while a user navigates and interacts within a scene. In one embodiment, the system 100 first determines a virtual floor, bottom, or ground surface (i.e., a virtual 3D plane) of at least one presentation of a perspective-based display of location information in a user device, such as a mobile device (e.g., a mobile phone or a tablet). By way of example, the perspective-based display can be a touch screen. In one example use case, the processes of the system 100 may start when the device is placed by a user in a position where the display of the device is parallel to the ground in the real-world environment. The system 100 can then cause, at least in part, a presentation of a map view in the display, including one or more points of interest (POIs) (e.g., a restaurant, a hotel, a tourist attraction, etc.) with known geographic coordinates. In particular, the virtual floor surface beneath a user's virtual location within the perspective-based display is generally not determined by the system 100 due to the limitations of panoramic capture techniques and, therefore, may be occluded by the system 100 without obstructing important additional information. Moreover, the location information includes, at least in part, one or more POIs, mapping information, or a combination thereof and the perspective-based display is a mapping display that includes, at least in part, a live view of the real-world environment, a captured panorama, a still image, a three-dimensional map (3D map), or a combination thereof. In one example use case, both the map view and the perspective-based display include a caption area displaying the current real-world location of the user (e.g., "Soho, N.Y.").

In one or more embodiments, the system 100 next determines an input to bring the virtual floor surface into view in the perspective-based display (e.g., an input for tilting the perspective-based display so that the virtual floor surface is brought into view). More specifically, the input includes, at least in part, a tilt input, a gesture input, a touch input, or a combination thereof. By way of example, if one or more sensors (e.g., a tilt or angle sensor, a global position system (GPS) receiver, accelerometers, a compass, etc.) are active on the user device, the user can tilt his or her device down towards the ground in the real-world environment to bring the virtual floor surface into view in the perspective-based display. It particular, it is contemplated that this interaction matches the metaphor of looking down to see a map while walking down a street and, therefore, maintains the user's sense of spatial immersion. In addition to tilting the device, in one example use case, the user may place his or her finger on the display (e.g., on the center area of the display) and push his or her finger away from his or her body, or push his or her finger upwards and downwards on the display to bring the virtual floor surface into view. In a further example use case, the user may also manipulate a zoom control, toggle element, or any key buttons (e.g., the zoom out (−)) to bring into view the virtual floor surface.

In one embodiment, the system 100 then causes, at least in part, an initiation of a rendering of a partial map view based, at least in part, on the input. For example, if the system 100 determines a slight tilt of the device (e.g., <45°), then the system 100 can cause, at least in part, a transformation of the perspective-based display, a transformation of a full map view (e.g., a cropping of the full map view) to produce the partial map view (e.g., a mini-map), and a presentation of a tilt message or notification (e.g., "Tilt your device upright"), prompting further action on the part of the user. In particular, tilting the device towards the ground causes the partial map view to fade into view, such that the orientation of the partial map view remains perpendicular to the real-world ground during the tilt transition. In addition, in one or more embodiments, the system 100 can cause, at least in part, the presentation of photos (e.g., stored on the user's device or obtained from a third-party service), messages that are attached to a geo-location, or the positions of one or more friends also to appear within the scene.

In one example use case, the partial map view includes, at least in part, a border including a compass orientation, such as a north indicator, mapping information associated with the position of the user, and respective representations of the orientation and position of the user. In addition, the partial map view may also be surrounded by one or more navigation arrows to aid a user with navigation within the scene (e.g., the arrows may point towards nearby captured panoramic views). Also, the system 100 causes, at least in part, a transition between the one or more representations associated with the map view (e.g., category pins) and the one or more representations associated with the augmented reality view (e.g., category squares and simplified squares). In particular, the system 100 determines one or more shapes and/or graphic representations to represent POIs in the user's field of view and one or more other shapes or graphic representations to represent one or more POIs outside of the user's field of view. Also, since the arrows match the street orientation on the partial map view, the user can have a better understanding based, at least in part, on the arrows of where he or she can move to within the scene. Further, the partial map view may contain street vectors and names, category symbols with cartographic places of interest and requested places of interest (e.g., search results), routes, route guiding vectors/arrows, flags, maneuver points, or any other type of icons that support the user's current context.

In one or more embodiments, the system 100 next causes, at least in part, a rendering of the partial map view on the virtual floor surface, wherein the partial map view provides an alternative or complimentary view of the location information. By way of example, the alternative view may be a 2D view, an abstracted view, or a combination thereof of the user's location in the real-world environment. More specifically, as the tilt of the device increases, for example, the system 100 causes, at least in part, the partial map view to seamlessly appear to get closer to the display and the center of the partial map view to move towards the bottom of the display. In particular, it is contemplated that a smooth and reflexive transition between the 2D map and the augmented reality view promotes a strong association between the views and reduces the sense of ambiguous placement of the one or more representations corresponding to respective POIs in the perspective-based display. Moreover, in one or more embodiments, the system 100 also causes, at least in part, a presentation of a radar-like overview of the location information located within at least one bounding area or field of view. By way of further example, the radar-like overview also includes, at least in part, a compass orientation (e.g., a north indicator), at least one representation of the POI density in the field of view, and respective representations of the user's orientation and position within the scene. In addition, the radar-like overview can also represent selected location information (e.g., POIs) as well as those POIs that are not within the user's field of view. Further, the radar-like overview can also indicate a masked area that depicts an area that is closer to the user than an active zoom level so that objects on the masked area are not visible to the user.

In certain embodiments, the system 100 then causes, at least in part, one or more modifications of the rendering of the partial map view based, at least in part, on the input, a viewing direction, or a combination thereof. In one example use case, if the system 100 determines an input (e.g., a tilt gesture >45°), then the system 100 can cause, at least in part, the partial map view to begin fading out of the perspective-based display and the radar-like overview to begin fading in. Moreover, the system 100 can also cause, at least in part, the one or more representations of the nearby POIs to lift up from the partial map view and to move into the augmented reality view (e.g., a panoramic scene), gradually scaling and expanding accordingly. In addition, when the system 100 determines that the device is in an upright position (e.g., perpendicular to the ground in the real-world) based, at least in part, on one or more sensors on the device, the system 100 can cause, at least in part, one or more representations of POIs not displayed in the partial map view (e.g., POIs in the background) to appear within the scene towards the middle/top of the perspective-based display and the partial map view to partly or completely disappear from the scene. In one embodiment, if the system 100 determines a change of the field of view (e.g., a rotation of the device) based, at least in part, on the one or more sensors on the device (e.g., a compass, a magnetometer, etc.), then the system 100 can cause, at least in part, the partial map view to rotate accordingly. Also, in one example use case, when a north indicator is not visible within the display, the system 100 can cause, at least in part, an extrapolation to present the indicator in the display margins of the device corresponding to its true position on the partial map view.

As previously discussed, in one embodiment, the system 100 determines the one or more representations of the location information based, at least in part, on the input, the viewing direction, or a combination thereof. By way of example, during the map view (i.e., the device is parallel to the ground), the system 100 may present the one or more representations of the one or more POIs as a dot on the respective geographic location on the map with an attached pin symbol containing a category glyph (e.g., a fork and knife for a restaurant, a camera for a tourist attraction, a bed for a hotel, etc.). Moreover, in one or more embodiments, if the system 100 determines an input (e.g. tilting the device upwards <45°), then the system 100 can cause, at least in part, at least one transition between the one or more representations associated with the map view (e.g., category pins) and the one or more representations associated with the augmented reality view (e.g., category squares). In particular, it is contemplated that the system 100 causes, at least in part, a gradual transition between the one or more representations so that the user can better understand how the one or more representations complement one another, and/or so that the one or more representations has a smooth transition/trajectory from the augmented reality view to the full map view. More specifically, a user can easily and visually follow to which location the one or more representations drops or moves on the map view and in the augmented reality view vice versa. Moreover, while the map view and the augmented reality view may fade in or out respectively, the one or more representations remain visible and smoothly float to their correct positions between the respective views.

In one example use case, the system 100 may cause, at least in part, the one or more representations, such as category pins, to become detached from their respective specific geographic location dots, become one or more category squares (e.g., with straight or rounded edges), or become one or more simplified dot-like representations, for example. In another example use case, when the system 100 determines that the device is not tilted, the system 100 can cause, at least in part, the one or more category squares to appear parallel to the map. Then, when the system 100 determines that the device is being tilted (e.g., substantially at 45°), the system 100 can cause, at least in part, the one or more representations to appear as though they are standing perpendicular to the virtual floor surface (i.e., they are gravity aware). Further, if the system 100 determines that the device is being tilted beyond a threshold (e.g., >45°), then the system 100 can cause, at least in part, the category squares to appear to float into position relative to the perspective-based display and the underlying map to begin to fade out. In particular, it is contemplated that the floating of the one or more representations reinforces the three-dimensional quality of the scene. Further, in one example use case, as the system 100 causes, at least in part, the transition between the one or more representations associated with the map view (e.g., category pins) and the one or more representations associated with the augmented reality view (e.g., category squares), the system 100 can cause, at least in part, the one or more category squares representing the POIs in the foreground to rise up slightly, expand to reveal additional information associated with the respective POI (e.g., contact information, ratings/reviews, distance to the viewing location, etc.).

In one or more embodiments, the system 100 next determines at least one user context associated with the partial map view. For example, the system 100 may determine that the user may be using his or her device (e.g., a mobile phone) to navigate and/or search for interesting POIs (e.g., a well-known tourist attraction, a restaurant, etc.). In one embodiment, the system 100 can then cause, at least in part, a rendering of navigation information, the location information, or a combination thereof based, at least in part, on the context, wherein the navigation information, the location information, or a combination thereof is associated with the partial map view and/or the perspective-based display. In particular, it is contemplated that the information presented on the partial map view by the system 100 matches the user's context within the scene (i.e., the partial map view is context adaptive). Moreover, the system 100 can render maneuver points, flags, and/or routes for navigation (e.g., highlighted routes with street names), for example, when a user requests directions between one or more locations or uses his or her device for navigation while walking. In addition, when the system 100 determines that the user is searching for one or more POIs, the system 100 can cause, at least in part, a presentation of the respective representations to aid the user in locating the POIs (i.e., the partial map view can also function as a radar). Further, in one embodiment, during the navigation context, the system 100 can cause, at least in part, a representation of the route guidance information (e.g., a highlighted route) in the partial map view to lift in conjunction with the tilting of the device so that at least part of highlighted route seamlessly moves to and appears on a ceiling above the user's virtual location within the perspective-based display area.

In one or more embodiments, the system 100 can also cause, at least in part, one or more modifications of the rendering of the partial map view based, at least in part, on one or more interactions with the perspective-based display, wherein the one or more interactions include, at least in part, a navigation within the mapping display (e.g., a panoramic view). By way of example, if a user places his or her finger on the display (e.g., in the center of area of the display) and drags his or her finger to the left or right, the system 100 can cause, at least in part, a panning, respectively, of the scene and rotate the partial map view accordingly. In addition, if the system 100 determines a pull interaction or a push interaction with the one or more POIs, the perspective-based display, or a combination thereof (i.e., a zoom in or zoom out, respectively), then the system 100 can cause, at least in part, an update of the partial map view to display the POIs currently within the user's field of view based, at least in part, on the pull interaction or the push interaction. Moreover, the system 100 can represent the change in the POIs position as a result of the pull interaction or push interaction simultaneously in both the partial map view and the perspective-based display.

In certain embodiments, the system 100 determines an input with the partial map view for exiting the perspective-based display. By way of example, the user can double tap or use a long-press gesture on the partial map view, the device, or a combination thereof to exit from the perspective-based display to a full map view (e.g., a 2D map). In addition, the user can zoom out from the virtual floor surface to exit the augmented reality view. In one embodiment, the system 100 can then cause, at least in part, an initiation of a rendering of the map view based, at least in part, on the input. In particular, the system 100 can cause, at least in part, a presentation of a display cue (e.g., a photographic image attached to a geographic location marker) in the map view to enable users to easily transition to a captured street panorama.

As shown in FIG. 1, the system 100 comprises a user equipment (UE) 101 (e.g., a mobile phone or a tablet) having connectivity to mapping platform 103 via a communication network 105. The UE 101 may include or have access to one or more applications 107a-107m (also collectively referred to as applications 107). By way of example, the applications 107 may include, at least in part, an augmented and/or mixed reality application, a mapping and/or navigation application, a media application, a social networking application, etc. In addition, the UE 101 also includes one or more sensors 109a-109n (also collectively referred as sensors 109). In particular, the sensors 109 may include, for example, a GPS receiver, a compass, a magnetometer, a tilt or angle sensor, an accelerometer, etc.

In one embodiment, the mapping platform 103 may include or be associated with at least one POI database 111. In one example embodiment, the mapping platform 103 may exist in whole or in part within the UE 101, or independently, and the POI database 111 may exist in whole or in part within the mapping platform 103, or independently. The POI database 111 may include one or more partial map views and one or more representations of the one or more POIs (e.g., POIs associated with a map view, POIs associated with an augmented reality view, or a combination thereof). The POI database 111 also may include one or more elements associated with the partial map view and/or a user's context with the application (e.g., street vectors and names, category symbols, routes, route guiding vectors/arrows, flags, maneuver points, or any other type of icons that support the user's current context).

The UE 101 is also connected to a services platform 113 via the communication network 105. The services platform 113 includes one or more services 115a-115p (also collectively referred to as services 115). The services 115 may include a wide variety of content provisioning services for the applications 107. By way of example, the services 115 may include mapping services, navigation services, search related services, media services (e.g., panoramic images, still images, 3D maps, etc.), social networking services (e.g., ratings/review of POIs), location-based services (e.g., locations of friends), etc. The UE 101, the services platform 113, and the services 115 also have connectivity to one or more content providers 117a-117q (also collectively referred to as content providers 117). The content providers 117 also may provision a wide variety of content (e.g., maps, images, etc.) to the components of the system 100. In one example embodiment, the services platform 113, mapping platform 103, POI database 111 and/or content provider 117 may be combined in one or more combinations.

In certain embodiments, the mapping platform 103 and/or one or more applications 107 may utilize location-based technologies (e.g., GPS, cellular triangulation, Assisted GPS (A-GPS), etc.) to determine the location of the UE 101. For example, a UE 101 may include a sensor 109 (e.g., a GPS receiver) to obtain geographic coordinates from satellites 119 to determine its current location relative to one or more POIs in the nearby vicinity. In addition, the one or more applications 107 may make a request to one or more services 115 and/or one or more content providers 117 for location-based data (e.g., maps, POIs, distances, etc.) based on a position relative to the UE 101.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of user terminal, mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the mapping platform 103 first determines a virtual floor, bottom or ground surface (i.e., a virtual 3D plane) of at least one presentation of a perspective-based display of location information in the UE 101, such as a mobile device (e.g., a mobile phone or a tablet). For example, the perspective-based display of the UE 101 can be a touch screen. In one example use case, the processes of the mapping platform 103 may start when a user places the UE 101 (e.g., a mobile phone) in a position where the display of the UE 101 is parallel to the ground in the real-world environment. The mapping platform 103 can then cause, at least in part, a presentation of a map view in the display, including one or more POIs (e.g., a restaurant, a hotel, a tourist attraction, etc.) with known geographic coordinates. In particular, the location information includes, at least in part, one or more POIs, mapping information, or a combination thereof and the perspective-based display is a mapping display that includes, at least in part, a live view of the real-world environment, a captured panorama, a still image, a 3D map, or a combination thereof.

In one or more embodiments, the mapping platform 103 next determines an input to bring the virtual floor surface into view in the perspective-based display. In particular, the input includes, at least in part, a tilt input (e.g., tilting the perspective based display), a gesture input, a touch input, or a combination thereof. By way of example, if one or more sensors 109 (e.g., a tilt or angle sensor, GPS, accelerometer, compass, etc.) are active on the UE 101, the user can tilt the UE 101 down towards the ground in the real-world environment to bring the virtual floor surface into view in the perspective-based display.

In one embodiment, the mapping platform 103 then causes, at least in part, an initiation of a rendering of a partial map view based, at least in part, on the input. For example, if the mapping platform 103 determines a slight tilt of the UE 101 (e.g., <45°), then the mapping platform 103 can cause, at least in part, an activation of the perspective-based display, a transformation of a full map view (e.g., a cropping of the full map view) to produce the partial map view, and a presentation of a tilt message or notification (e.g., "Tilt your device upright") prompting further action on the part of the user. In particular, tilting the UE 101 towards the ground causes the partial map view to fade into view, such that the orientation of the partial map view remains perpendicular to the real-world ground during the tilt transition.

In addition, the mapping platform 103 causes, at least in part, a transition between the one or more representations associated with the map view (e.g., category pins) and the one or more representations associated with the augmented reality view (e.g., category squares and simplified squares). In particular, the mapping platform 103 determines one or more shapes and/or graphic representations to represent POIs in the user's field of view and one or more other shapes and/or graphic representations to represent one or more POIs outside of the user's field of view.

In one or more embodiments, the mapping platform 103 next causes, at least in part, a rendering of the partial map view on the virtual floor surface, wherein the partial map view provides an alternative or complimentary view of the location information (e.g., POIs, mapping information, etc.). For example, the alternative view is a 2D view, an abstracted view, or a combination thereof of the user's location in the real-world environment. In particular, as the tilt of the UE 101 increases, for example, the mapping platform 103 causes, at least in part, the partial map view to seamlessly appear to get closer to the display and the center of the partial map view to move towards the bottom of the display. Moreover, it is contemplated that a smooth and reflexive transition between the 2D map and the augmented reality view promotes a strong association between the views and reduces the sense of ambiguous placement of the one or more representations corresponding to respective POIs in the perspective-based display. In one example embodiment, one or more 2D representations in the 2D view (e.g. the partial map view) seamlessly transform to respective 3D presentations in the augmented reality view during the view transition. Further, in one or more embodiments, the mapping platform 103 causes, at least in part, a presentation of a radar-like overview of the location information located within the at least one bounding area or field of view.

In certain embodiments, the mapping platform 103 then causes, at least in part, one or more modifications of the rendering of the partial map view based, at least in part, on the input, a viewing direction, or a combination thereof. For example, if the mapping platform 103 determines an input (e.g., a tilt gesture >45°), then the mapping platform 103 can cause, at least in part, the partial map view to begin fading out of the perspective-based display and the radar-like over to begin fading in. Moreover, the mapping platform 103 can also cause, at least in part, the one or more representations of the POIs to lift up from the partial map view and to move into the augmented reality view (e.g., a panoramic scene), gradually scaling and expanding accordingly. In addition, when the mapping platform 103 determines that the UE 101 is in an upright position (e.g., perpendicular to the ground) based, at least in part, on the sensors 109 (e.g., a tilt or angle sensor), the mapping platform 103 can cause, at least in part, one or more representations of POIs not displayed in the partial map view (e.g., POIs in the background) to appear within the scene towards the middle/top of the perspective-based display and the partial map view to partly or completely disappear from the scene. In one embodiment, if the mapping platform 103 determines a change of field of view (e.g., a rotation of the UE 101) based, at least in part, on the one or more sensors 109, then the mapping platform 103 can cause, at least in part, the partial map view to rotate accordingly. In addition, in one example use case, when a north indicator is not visible within the display, the mapping platform 103 can cause, at least in part, an extrapolation to present the indicator in the display margins of the UE 101 corresponding to its true position on the partial map view.

As previously discussed, in one embodiment, the mapping platform 103 determines the one or more representations of the location information based, at least in part, on the input, the viewing direction, or a combination thereof. For example, during the map view (i.e., the UE 101 is parallel to the ground), the mapping platform 103 may present the one or more presentations as a dot on a specific geographic location on the map with an attached pin symbol containing a category glyph. Moreover, in one or more embodiments, if the mapping platform 103 determines an input for titling the UE 101 (e.g., a tilt input upwards <45°), then the mapping platform 103 can cause, at least in part, at least one transition between the one or more representations associated with the map view (e.g., category pins) and the one or more representations associated with the augmented reality view (e.g., category squares). In particular, it is contemplated that the mapping platform 103 causes, at least in part, a gradual transition between the one or more representations so that the user can better understand how the one or more representations relate to and complement one another.

In one example use case, the mapping platform 103 may cause, at least in part, the one or more category pins to become detached from their respective geographic location dots, become one or more category squares or cones (e.g., with straight or rounded edges), or become one or more simplified dot-like representations, for example. In another example use case, when the mapping platform 103 determines that the UE 101 is not tilted, the mapping platform 103 can cause, at least in part, the one or more category squares to appear parallel to the map. Then, when the mapping platform 103 determines that the UE 101 is being titled (e.g., at 45°), the mapping platform 103 can cause, at least in part, the one or more representations to appear as though they are standing perpendicular to the virtual floor surface (i.e., they are gravity aware). Further, if the mapping platform 103 determines that the UE 101 is being titled beyond a threshold (e.g., >45°), then the mapping platform 103 can cause, at least in part, the category squares to appear to float into position relative to the perspective-based display and the map to begin to fade out. Further, in one example use case, as the mapping platform 103 causes, at least in part, the transition between the one or more representations associated with the map view (e.g., category pins) and the one or more representations associated with the augmented reality view (e.g., category squares), the mapping platform 103 can cause, at least in part, the one or more category squares representing POIs in the foreground to rise up slightly, expand to reveal additional information associated with the respective POI.

In one or more embodiments, the mapping platform 103 next determines at least one user context associated with the partial map view. For example, the mapping platform 103 may determine that the user may be using his or her UE 101 to navigate and/or search for interesting POIs. In one embodiment, the mapping platform 103 can then cause, at least in part, a rendering of the navigation information, the location information, or a combination thereof based, at least in part, on the context, wherein the navigation information, the location information, or a combination thereof is associated with the partial map view and/or the perspective-based display. More specifically, it is contemplated that the information presented on the partial map view by the mapping platform 103 matches the user's context within the scene (i.e., the partial map view is context adaptive). Moreover, the mapping platform 103 can render maneuver points, flags, and/or routes for navigation, for example, when a user requests directions between one or more locations or is using his or her UE 101 for navigation while walking. In addition, when the mapping platform 103 determines that the user is searching for one or more POIs, the mapping platform 103 can cause, at least in part, a presentation of the respective representations to aid the user in locating the POIs. Further, in one embodiment, during the navigation context, the mapping platform 103 can cause, at least in part, a representation of the route guidance information (e.g., a highlighted route) to lift in conjunction with the titling of the UE 101 so that the highlighted route appears on a ceiling above the user's virtual location within the perspective-based display.

In one or more embodiments, the mapping platform 103 can also cause, at least in part, one or more modifications of the rendering of the partial map view based, at least in part, on one or more interactions with the perspective-based display, wherein the one or more interactions include, at least in part, a navigation within the mapping display. By way of example, if the mapping platform 103 determines a panning gesture with the perspective-based display, the mapping platform 103 can cause, at least in part, a panning, respectively, of the scene and rotate the partial map view accordingly.

In certain embodiments, the mapping platform 103 determines an input with the partial map view for exiting to a map view (e.g., a full map view). For example, the user can double tap or use a long-press gesture on the partial map view, the display of the UE 101, or a combination thereof to exit from the perspective-based display to a full map view. In one embodiment, the mapping platform 103 can then cause, at least in part, an initiation of a rendering of the map view based, at least in part, on the input.

By way of example, the UE 101, mapping platform 103, the applications 107, the services platform 113, the services 115, the content providers 117, and satellites 119 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
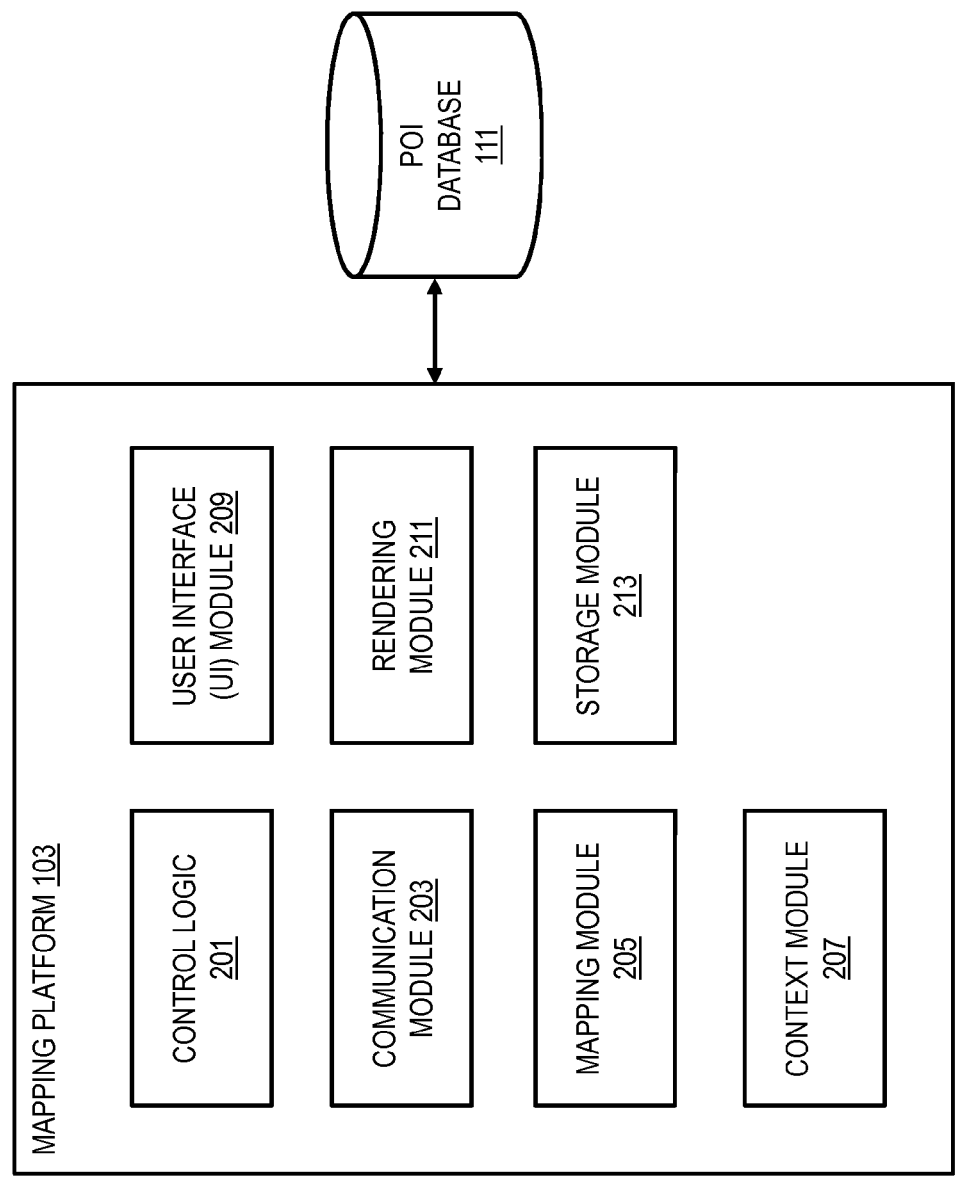
FIG. 2 is a diagram of the components of a mapping platform, according to one embodiment.

FIG. 2 is a diagram of the components of a mapping platform 103, according to one embodiment. By way of example, the mapping platform 103 includes one or more components for providing a partial map view that compliments an augmented reality view while a user navigates and interacts within a scene. It is contemplated that the functions of these components may be combined in one or more components or performed by other components of equivalent functionality. In this embodiment, the mapping platform 103 includes a control logic 201, a communication module 203, a mapping module 205, a context module 207, a user interface (UI) module 209, a rendering module 211, and a storage module 213.

The control logic 201 oversees tasks, including tasks performed by the communication module 203, the mapping module 205, the context module 207, the UI module 209, the rendering module 211, and the storage module 213. For example, although the other modules may perform the actual task, the control logic 201 may determine when and how those tasks are performed or otherwise direct the other modules to perform the task. The control logic 201, in connection with the rendering module 211, may also be used to cause, at least in part, an initiation of the rendering of the partial map view based, at least in part, on an input (e.g., a tilt input, a gesture input, a touch input, or a combination thereof). In addition, the control logic 201, also in connection with the rendering module 211, may be used to cause, at least in part, an initiation of a rendering of the map view (e.g., a full map view) based, at least in part, on an input (e.g., a double tap of the partial map view).

In one embodiment, the communication module 203 is used for communication between the UE 101, the mapping platform 103, the applications 107, the sensors 109, the POI database 111, the services platform 113, the services 115, the content providers 117, and the satellites 119. The mapping module 205 is used to determine a virtual floor surface of at least one presentation of a perspective-based display of location information. In particular, the virtual floor surface is located beneath a user's virtual location within the perspective-based display. Moreover, the perspective-based display is a mapping display that includes, at least in part, a live view of the real-world environment, a captured panorama, a still image, a 3D map, or a combination thereof.

In one embodiment, the context module 207, in connection with the UI module 209, is used to determine an input to bring the virtual floor surface into view in the perspective-based display (e.g., tilting the display so that the virtual floor surface is brought into view on a device). By way of example, the input includes, at least in part, a tilt input, a gesture input (e.g., a swiping motion), a touch input (e.g., a double tap or long-press gesture), or a combination thereof. The context module 207, in connection with the rendering module 211, may also be used to determine one or more representations of the location information (e.g., POIs, mapping information, or a combination thereof) based, at least in part, on the input, the viewing direction (e.g., a user's field of view), or a combination thereof. More specifically, if the context module 207 determines an input for tilting the device, then the rendering module 211 can cause, at least in part, one transition between the one or more representations associated with the map view (e.g., category pins) and the one or more representations associated with the augmented reality view (e.g., category squares). The context module 207 also may be used to determine at least one user context associated with the partial map view. For example, the context module 207 may determine that the user may be using his or her device to navigate and/or search for interesting POIs. Further, the context module 207, also in connection with the UI module 209, may be used to determine the input with the partial map view for exiting to a map view (e.g., a double tap of the partial map view).

As previously discussed, the user interface (UI) module 209 is used in connection with the context module 207 to determine an input to bring the virtual floor surface into view in the perspective-based display (e.g., a tilt input) virtual floor surface. The UI module 209, also in connection with the context module 207, may also be used to determine the input (e.g., a touch input) with the partial map view for exiting to a map view (e.g., a full map view). By way of example, a user can double tap or use a long-press gesture on the partial map view, the device, or a combination thereof to exit from the perspective-based display to a full map view (e.g., a 2D map).

In one embodiment, the rendering module 211, in connection with the control logic 201, is used to cause, at least in part, an initiation of the rendering of the mini-based, at least in part, on the input (e.g., a tilt input). The rendering module 211 may also be used to cause, at least in part, a rendering of a partial map view on the virtual floor surface, wherein the partial map view provides an alternate or complimentary view of the location information. In particular, the alternate view is a 2D view, an abstracted view, or a combination thereof. Moreover, as the tilt of the device increases, for example, the rendering module 211 causes, at least in part, the partial map view to seamlessly appear to get closer to the display and the center of the partial map view to move towards the bottom of the display. The rendering module 211, in connection with the context module 207, may also be used to cause, at least in part, one or more modifications of the rendering of the partial map view based, at least in part, on the input, a viewing direction, or a combination thereof. For example, if the context module 207 determines an input (e.g., a tilt gesture >45°), then the rendering module 211 can cause, at least in part, the partial map view to being fading out and the radar-like overview to begin fading in. Moreover, the rendering module 211 can also cause, at least in part, the one or more representations of the POIs to lift up from the partial map view and to move into the augmented reality view (e.g., a panoramic scene), gradually scaling and expanding accordingly.

As previously discussed, the rendering module 211, in connection with the context module 207, also may be used to determine one or more representations of the location information based, at least in part, on the input, the viewing direction, or a combination thereof. In one example use case, if the context module 207 determines an input for tilting the device (e.g., a tilt input upwards <45°), then the rendering module 211 can cause, at least in part, at least one transition between the one or more representations associated with the map view (e.g., category pins) and the one or more representations associated with the augmented reality view (e.g., category squares). The rendering module 211, also in connection with the context module 207, may be used to cause, at least in part, a rendering of navigation information, the location information, or a combination thereof based, at least in part, on the context, wherein the navigation information, the location information, or a combination thereof is associated with the mini map and/or the perspective-based display. In particular, it is contemplated that the information presented in the partial map view by the rendering module 211 matches the user's context within the scene (i.e., the partial map view is context adaptive). The rendering module 211, in connection with the UI module 209, also may be used to cause, at least in part, one or more modifications of the rendering of the partial map view based, at least in part, on one or more interactions with the perspective-based display, wherein the one or more interactions include, at least in part, a navigation in the mapping display. By way of example, if the UI module 209 determines a swiping gesture with the perspective-based display, then the rendering module 211 can cause, at least in part, a panning, respectively, of the scene and rotate the partial map view accordingly. Further, as previously discussed, the rendering module 211, in connection with the control logic 201, may also be used to cause, at least in part, an initiation of a rendering of a map view (a 2D map) based, at least in part, on the input (e.g., a double tap on the partial map view).

The storage module 213 is used to manage the storage the one or more partial map views and the one or more representations of the one or more POIs (e.g., POIs associated with a map view, POIs associated with an augmented reality view, or a combination thereof) stored in the POI database 111. The storage module 213 also may be used to manage the storage of the one or more elements associated with the partial map view and/or a user's context with the application (e.g., street vectors and names, category symbols, routes, route guiding vectors/arrows, flags, maneuver points, or any other type of icons that support the user's current context) also stored in the POI database 111.

Figure 3:
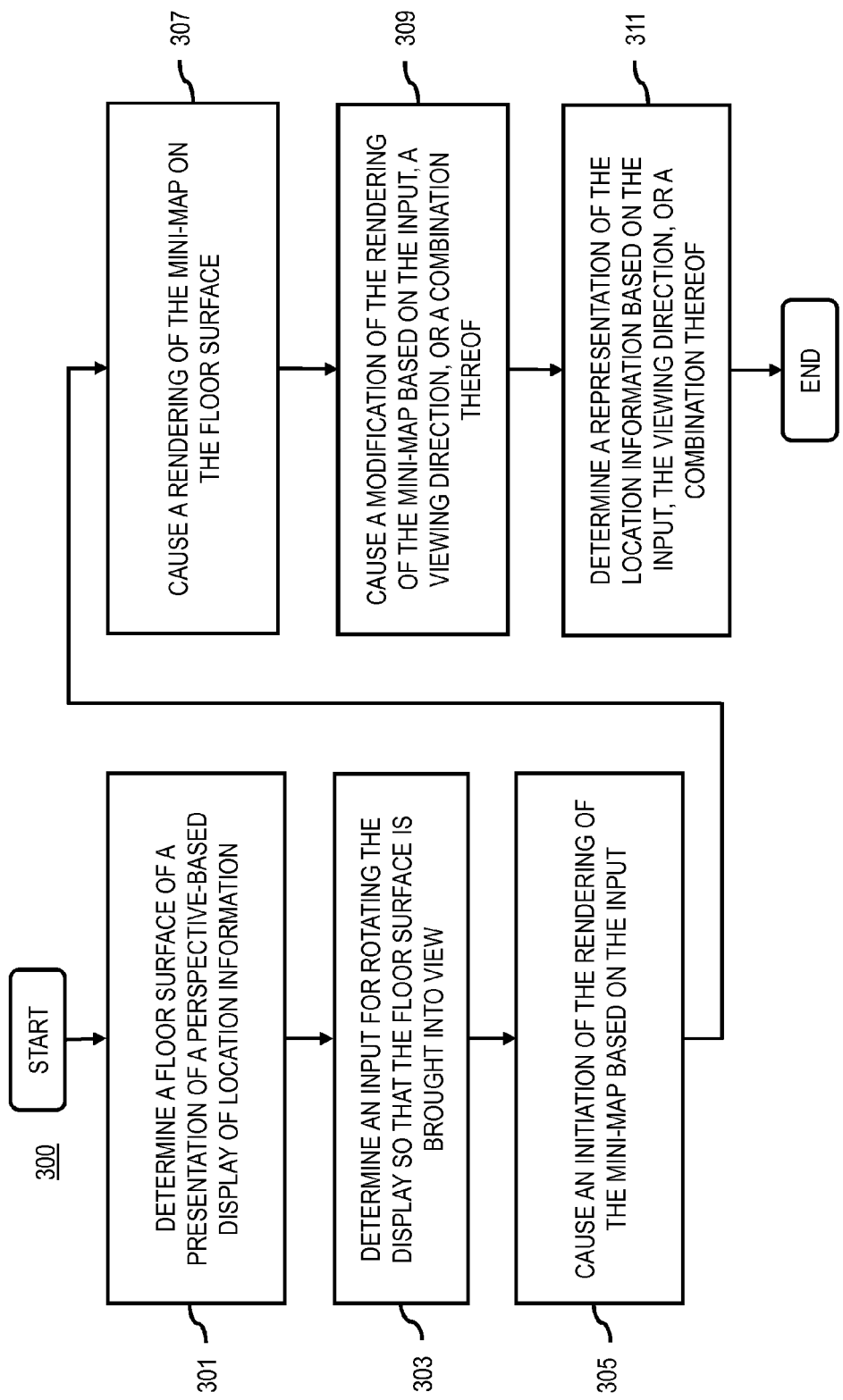
FIGS. 3 and 4 are flowcharts of processes for providing a partial map view that compliments an augmented reality view while a user navigates and interacts within a scene, according to one embodiment.
Figure 4:
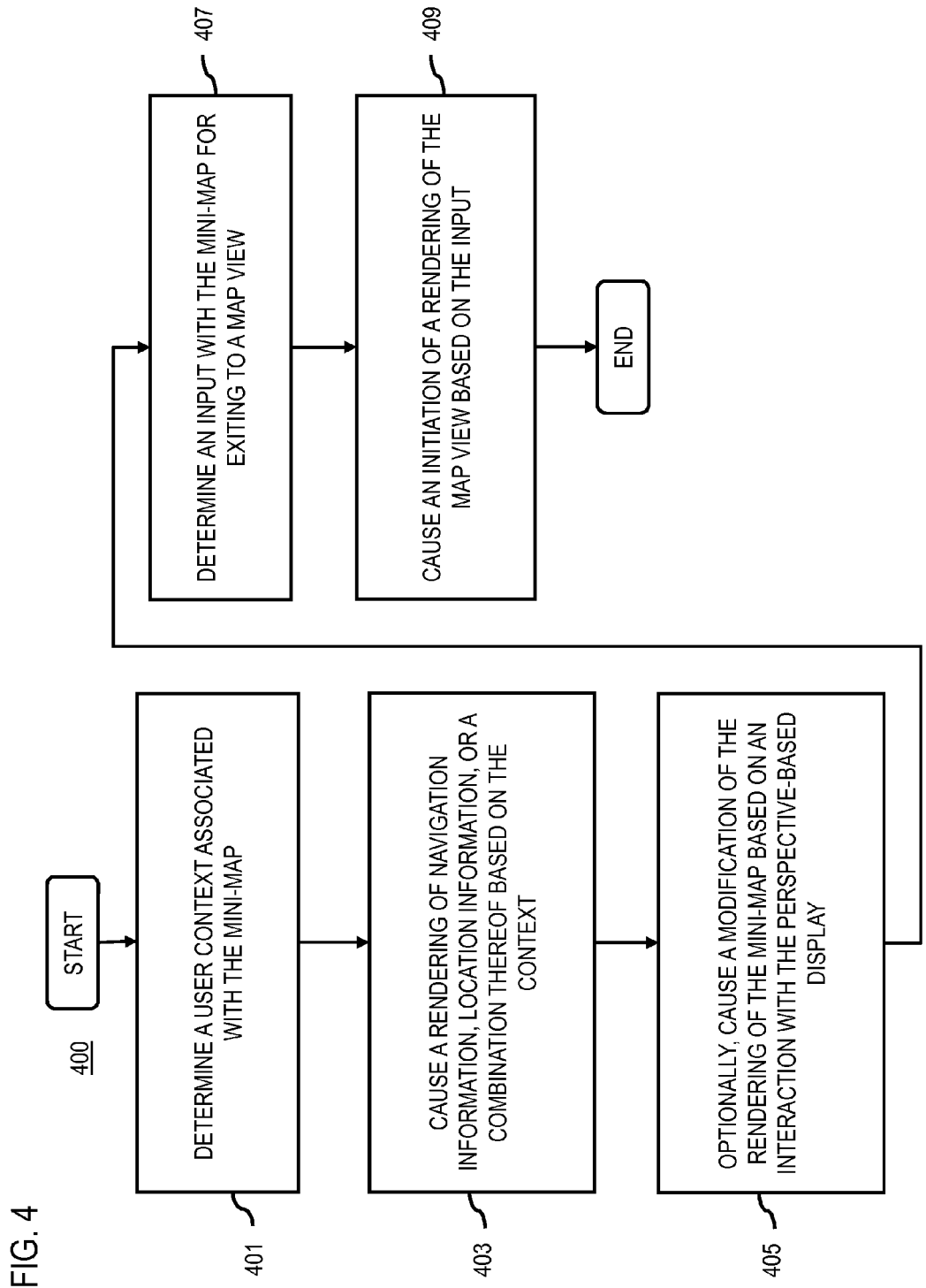
Figure 8:
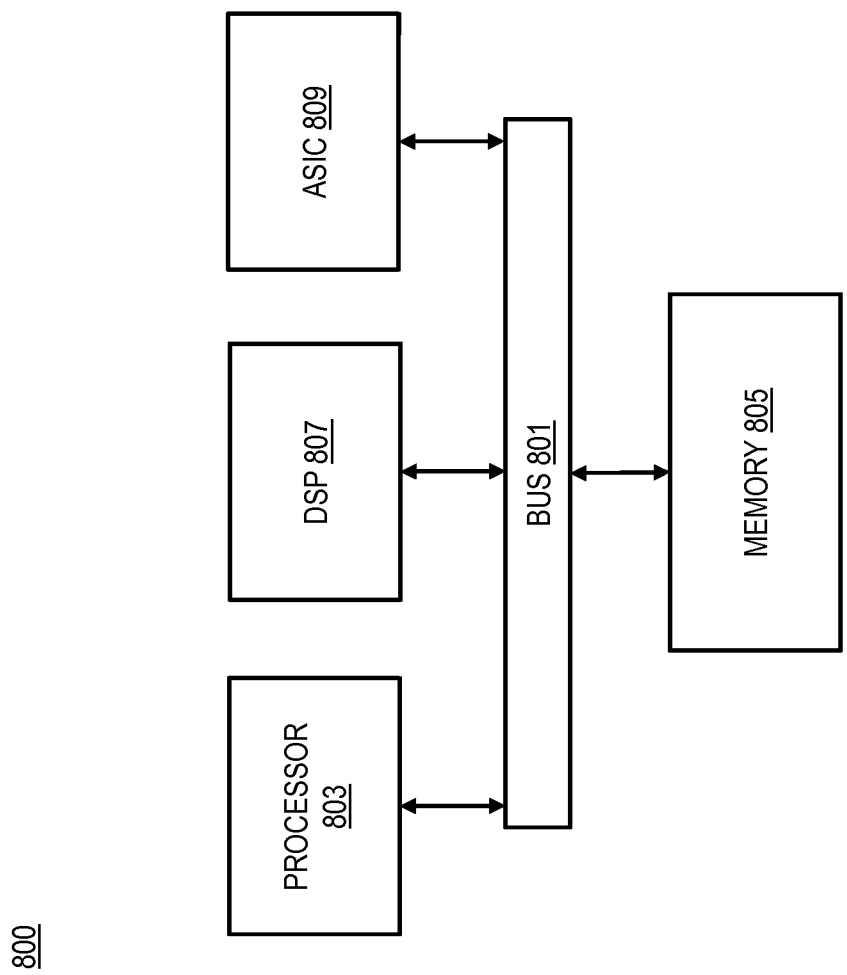
FIG. 8 is a diagram of a chip set that can be used to implement an embodiment of the invention.

FIGS. 3 and 4 are flowcharts of processes for providing a partial map view that compliments an augmented reality view while a user navigates and interacts within a scene, according to one embodiment. FIG. 3 depicts a process 300 of causing, at least in part, a rendering of a partial map view. In one embodiment, the mapping platform 103 performs the process 300 and is implemented in, for instance, a chip set including a processor and a memory as shown in FIG. 8. In step 301, mapping platform 103 determines a virtual floor surface of at least one presentation of a perspective-based display of location information. By way of example, the perspective-based display is a mapping display in a user device, such as a mobile device (e.g., a mobile phone or a tablet) that includes, at least in part, a live view of the real-world environment, a captured panorama, a still image, a 3D map, or a combination thereof. In addition, the location information includes, at least in part, one or more POIs, mapping information, or a combination thereof. Moreover, the perspective-based display can be a touch screen. By way of further example, the processes of the mapping platform 103 may start when a user places the device in a position where the display of the device is parallel to the ground in the real-world environment. The mapping platform 103 can then cause, at least in part, a presentation of a map view in the display, including one or more POIs (e.g., a restaurant, a hotel, a tourist attraction, etc.) with known geographic coordinates. More specifically, the virtual floor surface/plane beneath a user's virtual location within the perspective-based display is generally not determined by the mapping platform 103 due to the limitations of panoramic capture techniques and, therefore, may be occluded by the mapping platform 103 without obstructing important additional information.

In step 303, the mapping platform 103 determines an input to bring the virtual floor surface into view in the perspective-based display. In particular, the input includes, at least in part, a tilt input (e.g., tilting the perspective-based display), a gesture input, a touch input, or a combination thereof. By way of example, if one or more sensors (e.g., a tilt or angle sensor, GPS, accelerometers, a compass, etc.) are active on the user's device, the user can tilt his or her device down towards the ground in the real-world environment to bring into view the virtual floor surface in the perspective-based display. Moreover, it is contemplated that this interaction matches the metaphor of looking down to see a map while walking down a street and, therefore, maintains the user's sense of spatial immersion. Also, in addition to tilting the device, in one example use case, the user may place his or her finger on the display and push his or her finger away from his or her body, or upwards or downwards, to bring into view the virtual floor surface. In a further example use case, the user may also manipulate a zoom control, toggle element, or any key buttons (e.g., the zoom out (−)) to bring into view the virtual floor surface.

In step 305, the mapping platform 103 causes, at least in part, an initiation of the rendering of the partial map view based, at least in part, on the input. For example, if the mapping platform 103 determines a slight tilt of the device (e.g., <45°), then the mapping platform 103 can cause, at least in part, an activation of the perspective-based display, a transformation of the a 2D map to produce the partial map view, and a presentation of a tilt message or notification (e.g., "Tilt your device upright"), prompting further action on the part of the user. In particular, tilting the device towards the ground causes the partial map view to fade into view, such that the orientation of the partial map view remains perpendicular to the real-world ground during the tilt transition. Moreover, in one example use case, the partial map view includes, at least in part, a border including a compass orientation, such as a north indicator, mapping information associated with the user's position, and respective representations of the user's orientation and position within the scene. In addition, the partial map view may also be surrounded by one or more navigation arrows to aid the user with navigation within the scene (e.g., the arrows may point towards nearby captured panoramic views). More specifically, since the arrows match the street orientation of the partial map view, the user can have a better understanding based, at least in part, on the arrows of where he or she can move within the scene. Further, the partial map view may contain street vectors and names, category symbols with cartographic places of interest and requested places of interest (e.g., search results), routes, route guiding vectors/arrows, flags, maneuver points, or any type of icons that support the user's current context.

In step 307, the mapping platform 103 causes, at least in part, a rendering of a partial map view on the virtual floor surface, wherein the partial map view provides an alternate view of the location information. By way of example, the alternate view may be a 2D view, an abstracted view, or a combination thereof of the user's location in the real-world environment. In particular, as the tilt of the device increases, for example, the mapping platform 103 causes, at least in part, the partial map view to seamlessly appear to get closer to the display and the center of the partial map view to move towards the bottom the display. Moreover, it is contemplated that a smooth and reflexive transition between the 2D map and the augmented reality view promotes a strong association between the views and reduces the sense of ambiguous placement of the one or more representations corresponding to respective POIs in the perspective-based display. In one or more embodiments, the mapping platform 103 also causes, at least in part, a presentation of a radar-like overview of the location information located within at least one bounding area or field of view. By way of a further example, the radar-like overview also includes, at least in part, a compass orientation (e.g., a north indicator), at least one representation of the POI density in the field of view, and respective representations of the user's orientation and position within the scene. In addition, the radar-like overview can also represent selected location information (e.g., POIs) as well as those POIs which are currently not visible to the user.

In step 309, the mapping platform 103 causes, at least in part, one or more modifications of the rendering of the partial map view based, at least in part, on the input, a viewing direction, or a combination thereof. By way of example, if the mapping platform 103 determines an input (e.g., a tilt gesture >45°), then the mapping platform 103 can cause, at least in part, the partial map view to begin fading out of the perspective-based display and the radar-like overview to begin fading in. Moreover, the mapping platform 103 can also cause, at least in part, the one or more representations of the POIs to lift up from the partial map view, seamlessly or gradually transform from 2D form to 3D form, and to move into the augmented reality view (e.g., a panoramic scene), gradually scaling and expanding accordingly. In addition, when the mapping platform 103 determines that the device is in an upright position (e.g., perpendicular to the ground in the real-world) based, at least in part, on one or more sensors on the device, the mapping platform 103 can cause, at least in part, one or more representations of the POIs not displayed in the partial map view (e.g., POIs in the background) to appear within the scene towards the middle/top of the perspective-based display and the partial map view to completely disappear. Also, in one embodiment, if the mapping platform 103 determines a change of the field of view (e.g., a rotation of the device) based, at least in part, on the one or more sensors (e.g., a compass, a magnetometer, etc.), then the mapping platform 103 can cause, at least in part, the partial map view to rotate accordingly. In addition, the system 100 causes, at least in part, a transition between the one or more representations associated with the map view (e.g., category pins) and the one or more representations associated with the augmented reality view (e.g., category squares and simplified squares). In particular, the system 100 determines that the one or more category squares represent POIs in the user's field of view and the one or more simplified squares represent one or more POIs outside of the user's field of view.

In step 311, the mapping platform 103 determines one or more representations of the location information based, at least in part, on the input, the viewing direction, or a combination thereof. By way of example, during the map view (i.e., the device is parallel to the ground), mapping platform 103 may present the one or more representations of the one or more POIs as a dot on a respective geographic location on the map with an attached pin symbol containing a category glyph. Then, in one or more embodiments, if the mapping platform 103 determines an input for tilting the device (e.g., a tilt input upwards <45°), then the mapping platform 103 can cause, at least in part, at least one transition between the one or more representations associated with the map view (e.g., category pins) and the one or more representations associated with the augmented reality view (e.g., category squares). More specifically, it is contemplated that the mapping platform 103 causes, at least in part, a gradual transition between the one or more representations so that the user can better understand how the one or more representations complement one another.

FIG. 4 depicts a process 400 of causing, at least in part, one or more additional modifications of the partial map view. In one embodiment, the mapping platform 103 performs the process 400 and is implemented in, for instance, a chip set including a processor and a memory as shown in FIG. 8. In step 401, the mapping platform 103 determines at least one user context associated with the mini map. For example, the mapping platform 103 may determine that the user may be using his or her device (e.g., a mobile phone) to navigate and/or search for interesting POIs (e.g., a well-known tourist attraction, a restaurant, etc.).

In step 403, the mapping platform 103 causes, at least in part, a rendering of navigation information, the location information, or a combination thereof based, at least in part, on the context, wherein the navigation information, the location information, or a combination thereof is associated with the partial map view and/or the perspective-based display. More specifically, it is contemplated that the information presented on the partial map view by the mapping platform 103 matches the user's context within the scene (i.e., the partial map view is context adaptive). Moreover, the mapping platform 103 can render maneuver points, flags, and/or routes for navigation (e.g., highlighted routes with street names), for example, when a user requests directions between one or more locations or uses his or her device for navigation while walking. In addition, when the mapping platform 103 determines that the user is searching for one or more POIs, the mapping platform 103 can cause, at least in part, a presentation of the respective representations of the one or more POIs to the aid the user in locating the POIs (i.e., the partial map view can also function as a radar).

In step 405, the mapping platform 103 optionally causes, at least in part, one or more other modifications of the rendering of the partial map view based, at least in part, on one or more interactions with the perspective-based display, wherein the one or more interactions include, at least in part, a navigation in the mapping display. By way of example, if a user places his or her finger in the center of the display and drags his or her finger to the left or right, the mapping platform 103 can cause, at least in part, a panning, respectively, of the scene and rotate the partial map view accordingly.

In step 407, the mapping platform 103 determines the input with the partial map view for exiting to a map view. For example, the user can double tap or use a long-press gesture on the partial map view, the display of the device, or a combination thereof to exit from the perspective-based display to a full map view (e.g., a 2D map), or vice versa. Then in step 409, the mapping platform 103 causes, at least in part, an initiation of a rendering of the map view based, at least in part, on the input. By way of example, the mapping platform 103 can cause, at least in part, a presentation of a display cue (e.g., a photographic image attached to a geographic location marker) in the map view to enable users to easily transition to a captured street panorama.

Figure 5A:
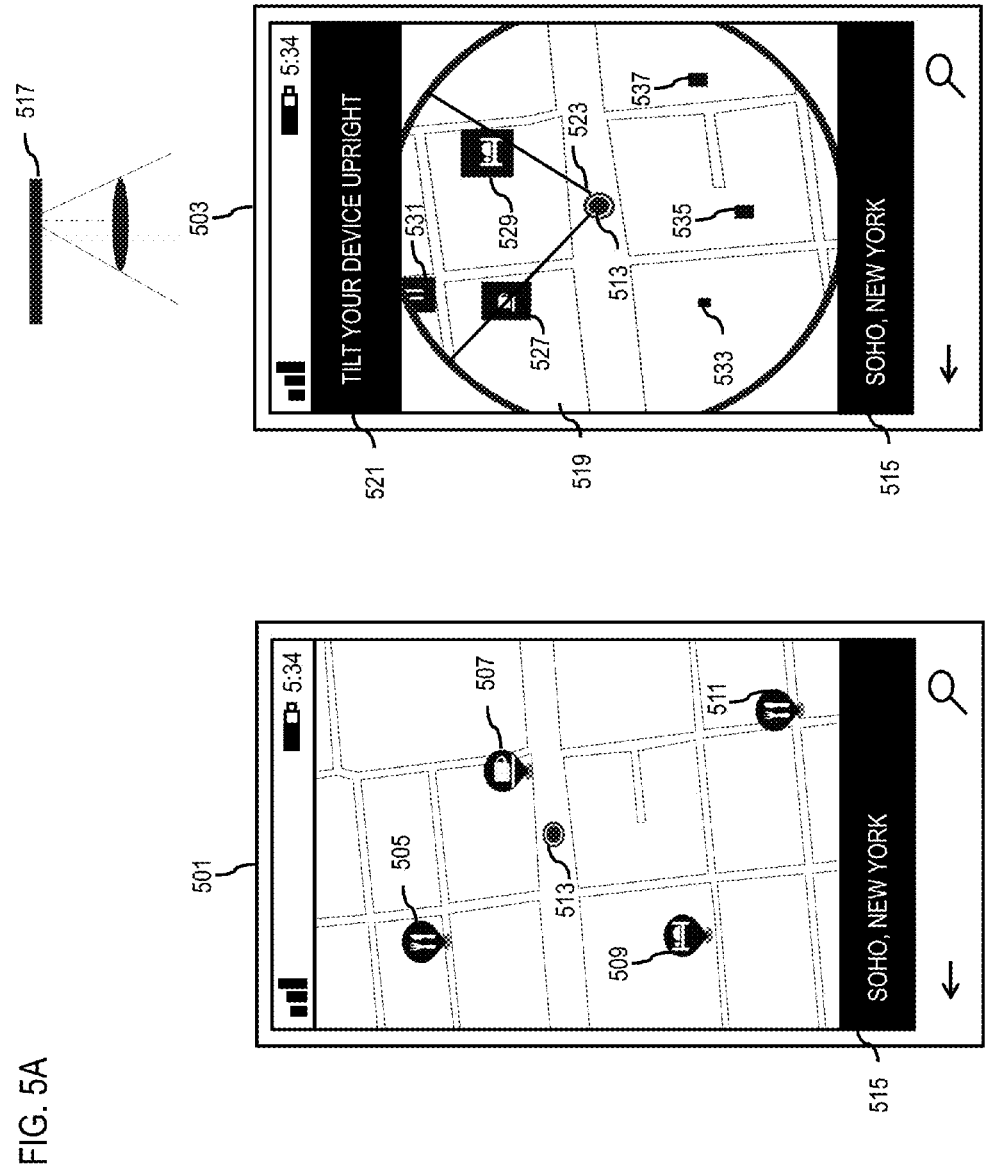
FIGS. 5A and 5B are diagrams of user interfaces utilized in the processes of FIGS. 3 and 4, according to various embodiments.
Figure 5B:
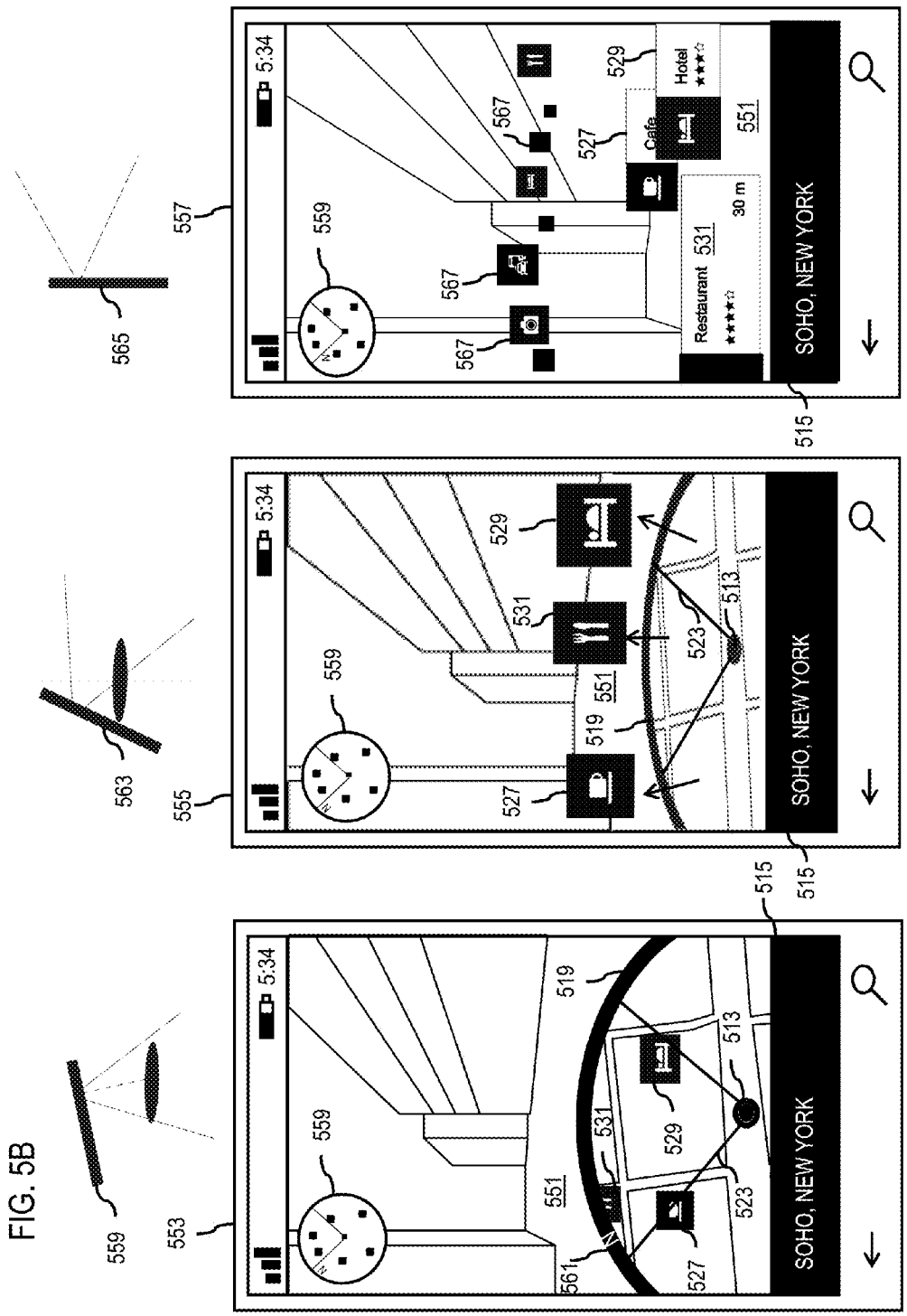

FIGS. 5A and 5B are diagrams of user interfaces utilized in the processes of FIGS. 3 and 4, according to various embodiments. As shown, the example user interfaces of FIGS. 5A and 5B include one or more user interface elements and/or functionalities created and/or modified based, at least in part, on information, data, and/or signals resulting from the processes (e.g., processes 300 and 400) described with respect to FIGS. 3 and 4. More specifically, FIG. 5A illustrates two user interfaces (e.g., interfaces 501 and 503) depicting one or more representations of the one or more POIs associated with a map view (e.g., category pins 505, 507, 509, and 511). By way of example, the category pins 505, 507, 509, and 511 include, at least in part, a dot on a specific geographic location on the map with an attached pin symbol containing a category glyph (e.g., a fork and knife for a restaurant, a coffee cup for a coffee, a bed for a hotel, etc.). In one or more embodiments, the map view, the partial map view, or a combination thereof also includes a representation of the user's position or location (e.g., position 513). Moreover, in one example use case, both the map view and the perspective-based display include a caption area 515 displaying the current real-world location of the user (e.g., "Soho, N.Y.").

In one or more embodiments, the system 100 first determines a virtual floor, bottom, or ground surface (i.e., a virtual 3D plane) of at least one presentation of a perspective-based display of location information in a user device (e.g., virtual floor surface 551 of interfaces 553, 555, and 557 of FIG. 5B). In one example use case, the processes of the system 100 may start when a user places the device (e.g., interface 503) in a position where the display of the device is parallel to the ground in the real-world environment as depicted in the key diagram 517. In one embodiment, the system 100 next determines an input to bring the virtual floor surface into view of the perspective-based display (e.g., interfaces 501 and 503). More specifically, the input includes, at least in part, a tilt input (e.g., tilting an interface), a gesture input, a touch input, or a combination thereof. By way of example, if one or more sensors (e.g., a tilt angle sensor) are active on the interface (e.g., interface 501), then the user can tilt the interface down towards the ground as depicted by interface 503 and the key diagram 517 to bring the virtual floor surface 551 into view in the perspective-based display as depicted in interfaces 553, 555, and 557. In particular, it is contemplated that this interaction matches the metaphor of looking down to see a map while walking down a street and, therefore, maintains the user's sense of spatial immersion.

In one embodiment, the system 100 then causes, at least in part, an initiation of a rendering of a partial map view 519 (e.g., a 2D abstraction of a map view or a mini-map) as depicted in interface 503. For example, if the system 100 determines a slight tilt of the device (e.g., <45°) as depicted by the key diagram 559 associated with interface 553, then the system 100 can cause, at least in part, an activation of the perspective-based display, a transformation of the two dimensional map of interface 501 to produce the partial map view 519, and a presentation of a tilt message or notification 521 (e.g., "Tilt your device upright"). In particular, tilting the interface (e.g., interface 501) towards the ground causes the partial map view 519 to fade into view, such that the orientation of the partial map view 519 remains perpendicular to the real-world ground during the tilt transition. More specifically, in one example use case, the partial map view 519 includes, at least in part, a border that includes a compass orientation, such as a north indicator 561 as shown in interface 553, mapping information associated with the position 513 of the user, a representation 523 of the orientation of the user within the scene. In addition, the system 100 causes, at least in part, a transition between the one or more representations associated with the map view of interface 501 (e.g., category pins 505, 507, 509, and 511) and the one or more representations associated with the augmented reality view of interfaces 553, 555, and 557 (e.g., category squares 527, 529, and 531 and simplified squares 533, 535, and 537). Further, the system 100 determines that the POIs represented by the category squares 527, 529, and 531 are in the user's field of view (e.g., based on the position 513 and the orientation 523) and the POIs represented by the simplified squares 533, 535 and 537 are outside of the user's field of view.

FIG. 5B illustrates three user interfaces (e.g., interfaces 553, 555, and 557) depicting one or more representations of a perspective-based display of location information (e.g., POIs, mapping information, etc.). Following from the illustrations of FIG. 5A, in one or more embodiments, the system 100 next causes, at least in part, a rendering of the partial map view 519 on the virtual floor surface 551, wherein the partial map view provides an alternative or complimentary view of the location information. More specifically, as the tilt of the interface 553 increases as depicted by the key diagram 559, for example, the system 100 causes, at least in part, the partial map view 519 to seamlessly appear to get closer to the display of interface 553 and the center of the partial map view 519 to move towards the bottom of the display of interface 553. Further, it is contemplated that a smooth and reflexive transition between the 2D map and the augmented reality view promotes a strong associated between the views and reduces the sense of ambiguous placement of the one or more representations corresponding to respective POIs in the perspective-based display (e.g., interfaces 553 and 555). In addition, in one or more embodiments, the system 100 also causes, at least in part, a presentation of a radar-like overview 559 of the location information located within at least one bounding area or field of view. By way of example, the radar-like overview also includes, at least in part, a compass orientation (e.g., a north indicator), at least one representation of the POI density in the field of view, and respective representations of the user's orientation and position within the scene. Further, the radar-like overview can also represent selected location information (e.g., POIs) as well as those POIs that are currently not in the user's field of view.

In certain embodiments, the system 100 then causes, at least in part, one or more modifications of the rendering of the partial map view 519 based, at least in part, on the input, a viewing direction, or a combination thereof. In one example use case, if the system 100 determines an input (e.g., a tilt gesture >45° as depicted by key diagram 563 associated with interface 555), then the system 100 can cause, at least in part, the partial map view 519 to begin fading out and the radar-like overview 559 to begin fading in. Moreover, the system 100 can also cause, at least in part, the one or more representations of the nearby POIs (e.g., category squares 527, 529, and 531) to lift up from the partial map view 519 and move into the augmented reality view as depicted in interface 555. Moreover, an arrow indicator may be presented between the lift-up POIs and their respective locations on the partial map view 519. Also, the system 100 can cause, at least in the part, the one or more representations (e.g., category squares 527, 529, and 531) to gradually scale and expand accordingly to present additional information as depicted in interface 557. In addition, when the system 100 determines that the interface (e.g., interface 555) is in an upright position (e.g., as depicted by the key diagram 565) based, at least in part, on the one or more sensors on the device, the system 100 can cause, at least in part, one or more representations of POIs not displayed in the partial map view 519 (e.g., POIs 567 located in the background) to appear in the scene towards the middle/top of the perspective-based display as depicted in interface 557 and the partial map view 519 to partly or completely disappear from the scene. Further, in one embodiment, if the system 100 determines a change of the field of view 523 (e.g., a rotation of an interface) based, at least in part, on the one or more sensors on the device (e.g., a compass, a magnetometer, etc.), then the system 100 can cause, at least in part, the partial map view 519 to rotate accordingly.

Figure 6:
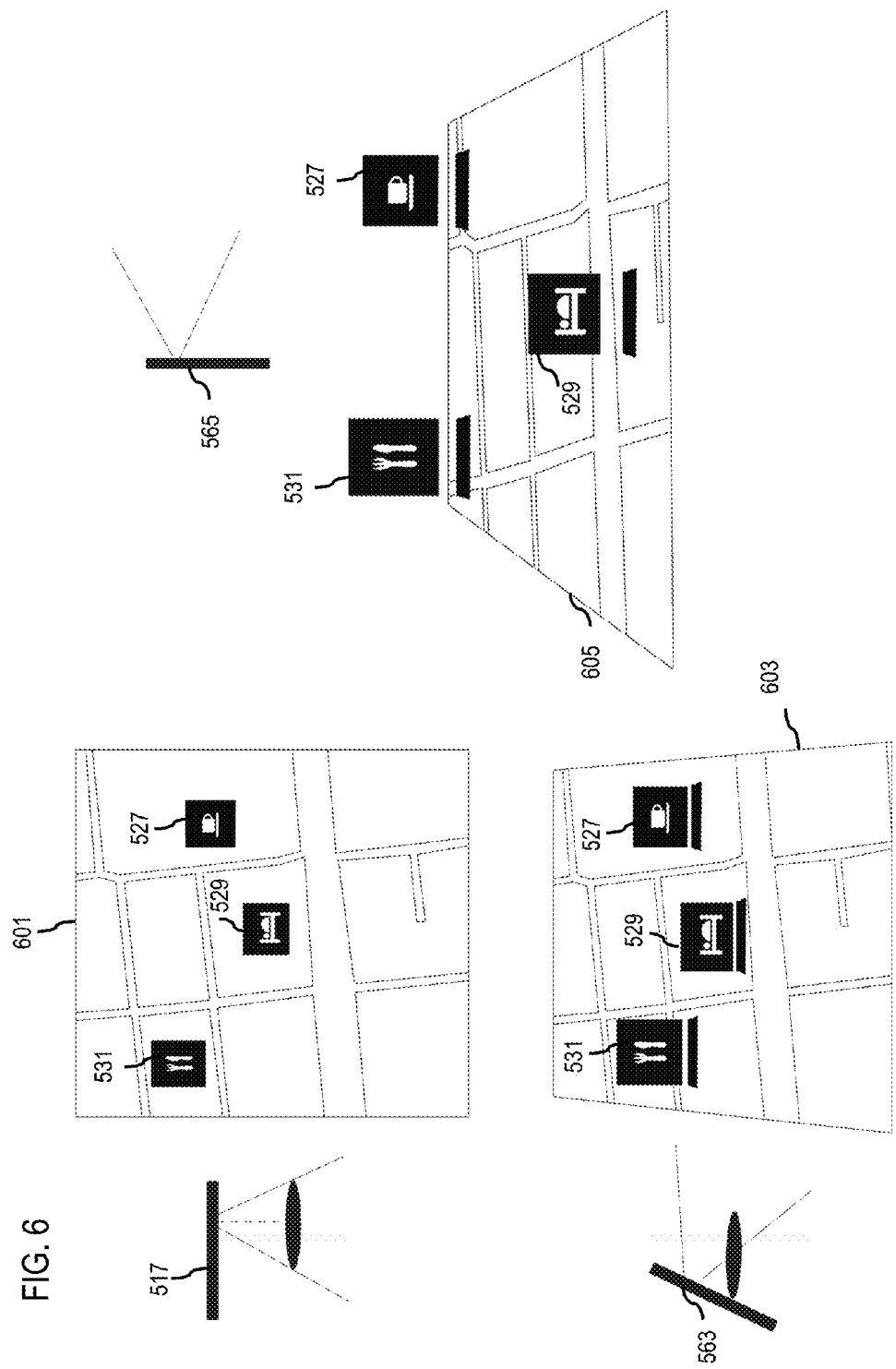
FIG. 6 is a diagram of partial user interfaces utilized in the processes of FIG. 4, according to various embodiments.

FIG. 6 is a diagram of partial user interfaces utilized in the process of FIG. 4, according to various embodiments. As shown, the example of partial user interfaces of FIG. 6 include one or more user interface elements and/or functionalities created and/or modified based, at least in part, on information, data, and/or signals resulting from the processes (e.g., process 400) described with respect to FIG. 4. More specifically, FIG. 6 illustrates three user interfaces (e.g., interfaces 601, 603, and 605) depicting one or more representations of one or more POIs associated with an augmented reality view (e.g., category squares 527, 529, and 531). Continuing with the example use case of FIGS. 5A and 5B, in one example use case, when the system 100 determines that interface 601 is not titled, the system 100 can cause, at least in part, the one or more category squares (e.g., category squares 527, 529, and 531) to appear parallel to the map of interface 601. Then, when the system 100 determines that the interface 603 is being titled (e.g., a 45°) as depicted by key diagram 563, the system 100 can cause, at least in part, the one or more representations (e.g., category squares 527, 529, and 531) to appear as though they are standing perpendicular to the virtual floor surface of interface 603 (i.e., they are gravity aware). Further, if the system 100 determines that interface 605 is being titled beyond a threshold (e.g., >45°) as depicted by the key diagram 565, then the system 100 can cause, at least in part the, the category squares (e.g., category squares 527, 529, and 531) to appear to float into position relative to the perspective-based display of interface 565 and the map to begin to fade out. Moreover, shadow indicators of the floating POIs (e.g., category squares 527, 529, and 531) may be presented at their respective locations on the partial map view 519. In particular, it is contemplated that the floating of the one or more representations (e.g., category squares 527, 529, and 531) reinforces the three-dimensional quality of the scene.

The processes described herein for providing a partial map view that compliments an augmented reality view while a user navigates and interacts within a scene may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
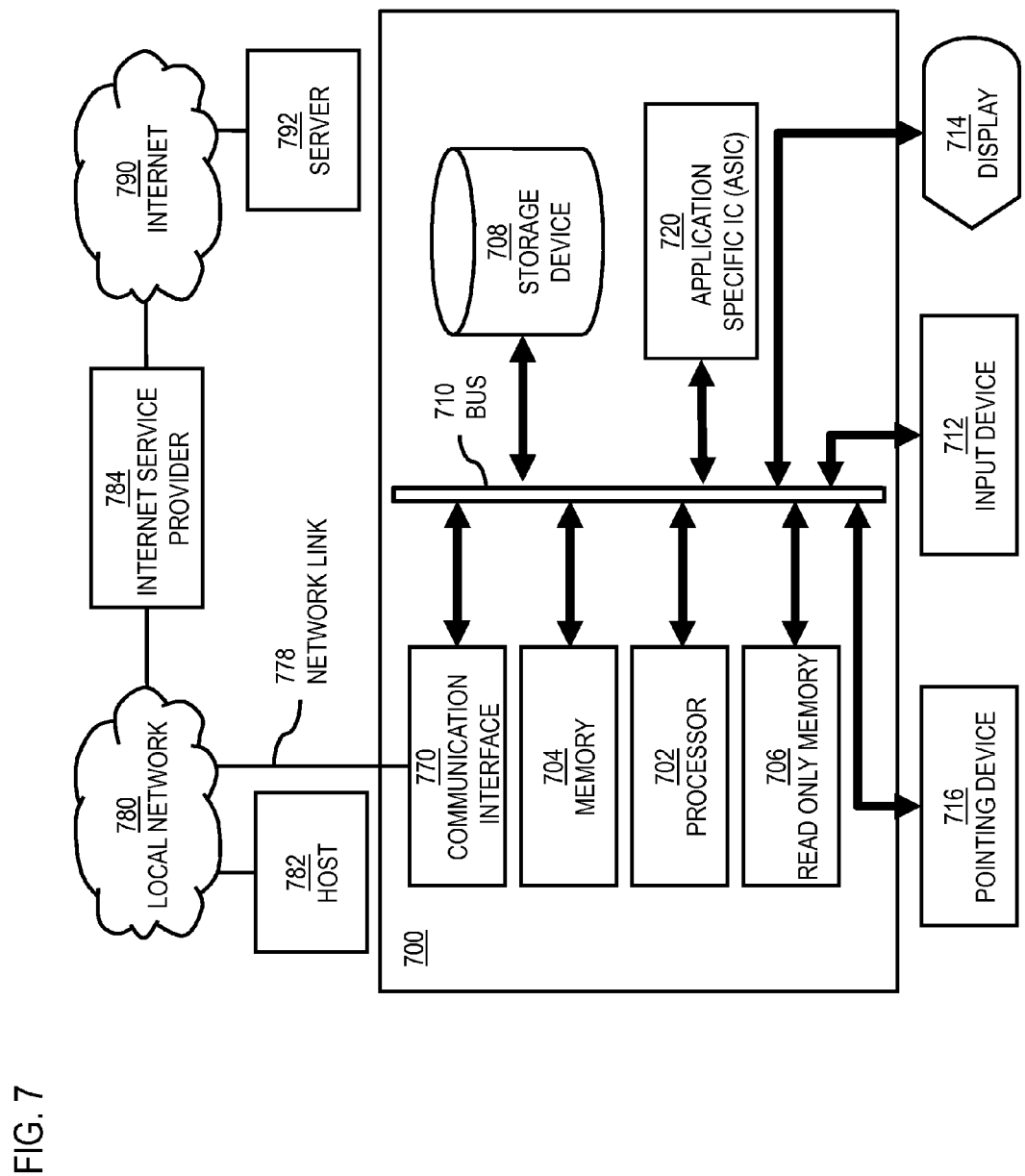
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide a partial map view that compliments an augmented reality view while a user navigates and interacts within a scene as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing a partial map view that compliments an augmented reality view while a user navigates and interacts within a scene.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to provide a partial map view that compliments an augmented reality view while a user navigates and interacts within a scene. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for providing a partial map view that compliments an augmented reality view while a user navigates and interacts within a scene. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing a partial map view that compliments an augmented reality view while a user navigates and interacts within a scene, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing a partial map view that compliments an augmented reality view while a user navigates and interacts within a scene to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to provide a partial map view that compliments an augmented reality view while a user navigates and interacts within a scene as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of providing a partial map view that compliments an augmented reality view while a user navigates and interacts within a scene.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide a partial map view that compliments an augmented reality view while a user navigates and interacts within a scene. The memory 805 also stores the data associated with or generated by the execution of the inventive steps.

Figure 9:
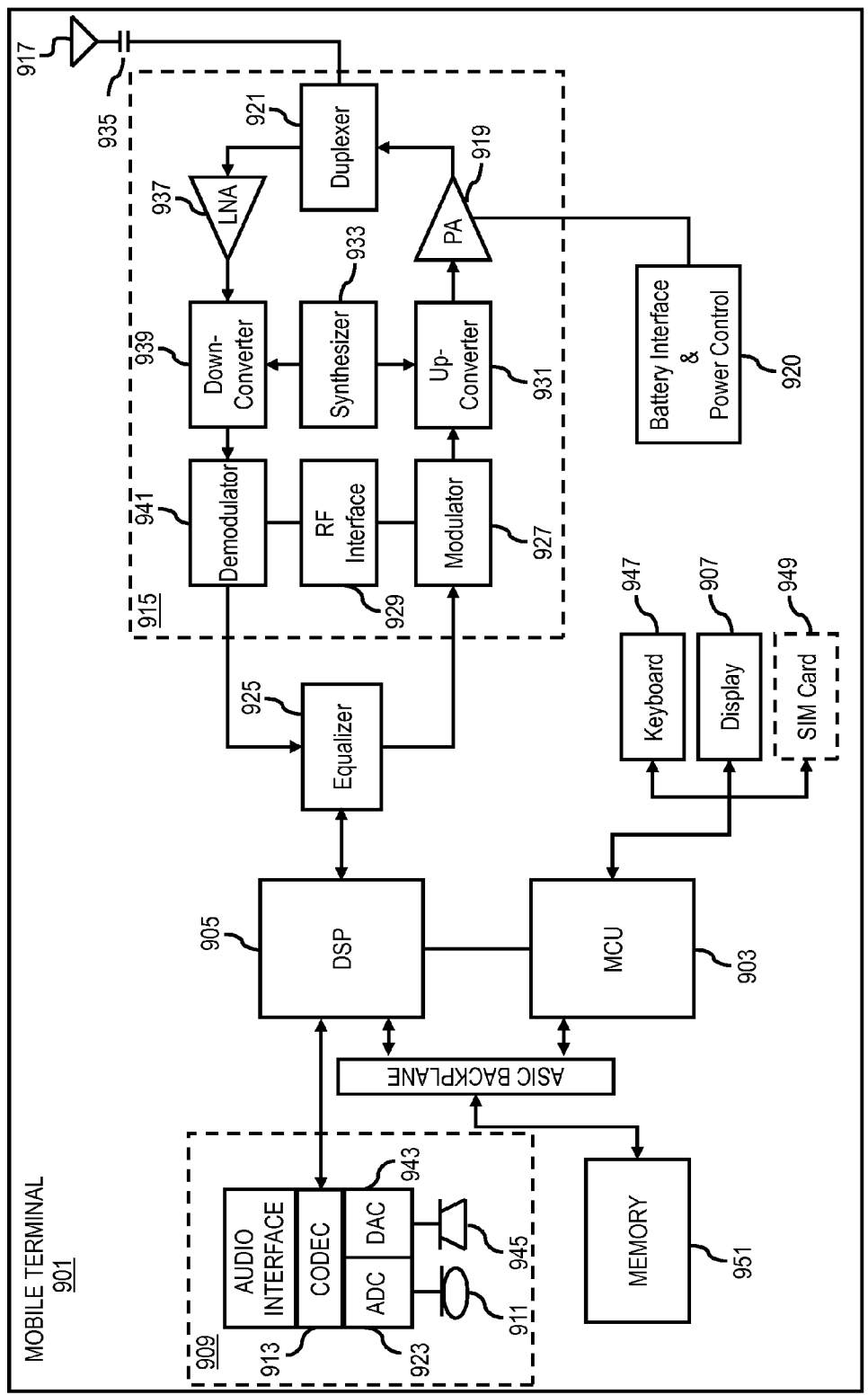
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of providing a map view that compliments an augmented reality view while a user navigates and interacts within a scene. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing a partial map view that compliments an augmented reality view while a user navigates and interacts within a scene. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide a partial map view that compliments an augmented reality view while a user navigates and interacts within a scene. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
rendering, at an apparatus, at least one three-dimensional presentation of a real-world field of view based on a real-world location and an orientation of the apparatus on a perspective-based display of location information associated with the field of view, wherein the at least one three-dimensional presentation includes a virtual floor surface shown at a bottom of the perspective-based display corresponding to a ground at the real-world location; and
upon receiving a tilt input that physically tilts the perspective-based display of the apparatus with respect to the ground to bring a partial two-dimensional map view into the perspective-based display from the bottom and to bring the at least one three-dimensional presentation out from a top of the perspective-based display, scaling up a display amount of the partial two-dimensional map view while scaling down a display amount of the at least one three-dimensional presentation relative to an angle of the tilt input in the perspective-based display, wherein the partial two-dimensional map view provides an alternate view of the location information.

2. A method of claim 1, further comprising:
in response to the tilt input transitioning from being upright to facing the ground, moving a perspective of the partial two-dimensional map view from being perpendicular to ground to being parallel to the ground on the perspective-based display relatively to the display amount of the partial two-dimensional map view as scaled up, and moving a perspective of the at least one three-dimensional presentation from being parallel to ground to being perpendicular to the ground on the perspective-based display relatively to the display amount of the at least one three-dimensional presentation as scaled down,
wherein the perspective-based display of the location information is a mapping display; and wherein the alternate view is an abstracted view.

3. A method of claim 2, wherein the at least one three-dimensional presentation further includes one or more three-dimensional graphic representations of one or more real-world buildings in the field of view on the virtual floor surface, and wherein the location information includes one or more graphic elements representing one or more real-world points of interest located within the one or more real-world buildings, and the method further comprising:
in response to the tilt input transitioning from being upright to facing the ground, moving one or more of the graphic elements from the at least one three-dimensional presentation into the partial two-dimensional map view, when the display amount of the partial two-dimensional map view is scaled up to include one or more of the locations of the real-world points of interest.

4. A method of claim 2, further comprising:
displaying a symbol of the real-world location of the apparatus on a position and markings of the real-world field of view originating from the symbol in the partial two-dimensional map view, when the display amount of the partial two-dimensional map view is scaled up to include the real-world location of the apparatus; and
in response to the tilt input transitioning from being upright to facing the ground, moving the position of the symbol and the markings in the partial two-dimensional map view relatively to the display amount of the partial two-dimensional map view as scaled up.

5. A method of claim 2, further comprising:
rendering a radar-like mini view of a bounding area centered at the real-world location of the apparatus on the perspective-based display,
wherein the location information includes, at least in part, one or more real-world points of interest located within the bounding area, mapping information, or a combination thereof.

6. A method of claim 5, further comprising:
determining at least one user context associated with the radar-like overview; and
rendering navigation information, the location information, or a combination thereof based, at least in part, on the context,
wherein the navigation information, the location information, or a combination thereof is associated with the partial two-dimensional map view, the at least one three-dimensional presentation, or a combination thereof.

7. A method of claim 5, wherein the radar-like overview depicts the real-world location of the apparatus, the real-world field of view, and the one or more real-world points of interest located within the bounding area.

8. A method of claim 7, wherein the radar-like mini view is an abstract version of the partial two-dimensional map view when the tilt input facing the ground.

9. A method of claim 1, further comprising:
generating one or more other modifications to the rendering of the partial two-dimensional map view based, at least in part, on one or more interactions with the perspective-based display,
wherein the one or more interactions include, at least in part, a navigation in the mapping display.

10. A method of claim 1, further comprising:
determining one or more representations of the location information based, at least in part, on the input, the orientation of the apparatus, or a combination thereof.

11. A method of claim 1, further comprising:
determining the input with the partial two-dimensional map view exiting to a map view; and
rendering the map view based, at least in part, on the input.

12. An apparatus comprising:
at least one processor; and
at least one memory including computer program code for one or more programs,
the at least one memory and the computer program code configured to, with the at least one processor, cause the apparatus to perform at least the following,
render at least one three-dimensional presentation of a real-world field of view based on a real-world location and an orientation of the apparatus on a perspective-based display of location information associated with the field of view, wherein the at least one three-dimensional presentation includes a virtual floor surface shown at a bottom of the perspective-based display corresponding to a ground at the real-world location; and
upon receiving a tilt input that physically tilts the perspective-based display of the apparatus with respect to the ground to bring a partial two-dimensional map view into the perspective-based display from the bottom and to bring the at least one three-dimensional presentation out from a top of the perspective-based display, scale up a display amount of the partial two-dimensional map view while scaling down a display amount of the at least one three-dimensional presentation relative to an angle of the tilt input in the perspective-based display, wherein the partial two-dimensional map view provides an alternate view of the location information.

13. An apparatus of claim 12, wherein the perspective-based display of the location information is a mapping display; and wherein the alternate view is an abstracted view.

14. An apparatus of claim 12, wherein the apparatus is further caused to:
while receiving the tilt input, move one or more icons from the at least one three-dimensional presentation into the partial two-dimensional map view based, at least in part, on the angle of the tilt input.

15. An apparatus of claim 12, wherein the apparatus is further caused to:
generate one or more modifications to the rendering of the partial two-dimensional map view based, at least in part, on the input, the orientation of the apparatus, or a combination thereof.

16. An apparatus of claim 12, wherein the apparatus is further caused to:
generate one or more other modifications to the rendering of the partial two-dimensional map view based, at least in part, on one or more interactions with the perspective-based display,
wherein the one or more interactions include, at least in part, a navigation in the mapping display.

17. An apparatus of claim 12, wherein the apparatus is further caused to:
determine one or more representations of the location information based, at least in part, on the input, the orientation of the apparatus, or a combination thereof.

18. An apparatus of claim 12, wherein the apparatus is further caused to:
determine at least one user context associated with a mini map; and
render navigation information, the location information, or a combination thereof based, at least in part, on the context,
wherein the navigation information, the location information, or a combination thereof is associated with the partial two-dimensional map view, the at least one three-dimensional presentation, or a combination thereof.

19. An apparatus of claim 12, wherein the apparatus is further caused to:
determine the input with the partial two-dimensional map view exiting to a map view; and
render the map view based, at least in part, on the input.

20. An apparatus of claim 12, wherein the location information includes, at least in part, one or more points of interest, mapping information, or a combination thereof.

* * * * *